United States Patent
Asensio et al.

(10) Patent No.: US 11,992,016 B2
(45) Date of Patent: May 28, 2024

(54) PINCHING-SHAPING DEVICE, AND SYSTEM FOR CONTINUOUS PRODUCTION OF FOODS PRODUCTS CO-EXTRUDED IN POUCH FORM

(71) Applicant: CLEXTRAL, Firminy (FR)

(72) Inventors: Luis Asensio, Savigneux (FR); Jimmy Huynh, Villars (FR); Julie Prost, Clearwater, FL (US)

(73) Assignee: CLEXTRAL, Firminy (FR)

( * ) Notice: Subject to any disclaimer, the term of this patent is extended or adjusted under 35 U.S.C. 154(b) by 512 days.

(21) Appl. No.: 17/290,558

(22) PCT Filed: Oct. 31, 2019

(86) PCT No.: PCT/EP2019/079820
§ 371 (c)(1),
(2) Date: Apr. 30, 2021

(87) PCT Pub. No.: WO2020/089391
PCT Pub. Date: May 7, 2020

(65) Prior Publication Data
US 2021/0400991 A1    Dec. 30, 2021

(30) Foreign Application Priority Data

Nov. 2, 2018   (FR) ........................................ 1860134

(51) Int. Cl.
*A21C 11/10*   (2006.01)
(52) U.S. Cl.
CPC .................... *A21C 11/10* (2013.01)
(58) Field of Classification Search
CPC ......... A21C 11/10; A21C 11/04; A21C 11/24; Y10T 83/2066; Y10T 83/2185; Y10T 83/8745

(Continued)

(56) References Cited

U.S. PATENT DOCUMENTS

| 3,310,006 A | * | 3/1967 | Hasten ................... A21C 11/00 156/515 |
| 3,504,640 A | | 4/1970 | Eiden et al. |

(Continued)

FOREIGN PATENT DOCUMENTS

| FR | 493.088 | 7/1919 |
| WO | 2017/153222 | 9/2017 |
| WO | 2017/160267 | 9/2017 |

OTHER PUBLICATIONS

International Search Report for PCT/EP2019/079820 dated Dec. 20, 2019, 6 pages.

(Continued)

*Primary Examiner* — Ghassem Alie
(74) *Attorney, Agent, or Firm* — NIXON & VANDERHYE

(57) ABSTRACT

This pinching-shaping device includes cylindrical tools, each having a central axis of tool rotation, the central axes being parallel and the outer peripheries of the tools applied tangentially against one another to pinch-shape a strand tangentially introduced between the tools during rotation. The outer periphery of each tool has radially projecting blades distributed around the central axis, each providing a pinching surface. The pinching surface extends between first and second ends inclined to the central axis. The blades of each tool are distributed following the outer periphery, alternating inclination. When a blade of the first tool is radially interposed between the two tools during the rotation, it is radially aligned with one of the blades of the second tool, the pinching surface inclined in a complementary manner to the pinching surface of first tool's blade, pinching the strand between pinching surfaces of these two aligned blades.

14 Claims, 12 Drawing Sheets

(58) Field of Classification Search
USPC .......... 83/130, 561; 425/336, 367, 369, 403, 425/304; 99/353, 404, 425, 355, 407, 99/426, 427; 426/557, 144, 451, 496, 426/503, 502
See application file for complete search history.

(56) References Cited

U.S. PATENT DOCUMENTS

| | | | |
|---|---|---|---|
| 4,289,470 A | 9/1981 | Johnston et al. | |
| 4,780,329 A | 10/1988 | D'Alterio | |
| 6,174,556 B1 | 1/2001 | Bornhorst et al. | |
| 11,013,238 B2 * | 5/2021 | Crosby | A21C 11/10 |
| 2019/0037858 A1 * | 2/2019 | Weinstein | A23P 30/25 |

OTHER PUBLICATIONS

Written Opinion of the ISA for PCT/EP2019/079820 dated Decmeber 20, 2019, 7 pages.
French Search Report for FR 1860134 dated Jul. 2, 2019, 2 pages.

* cited by examiner

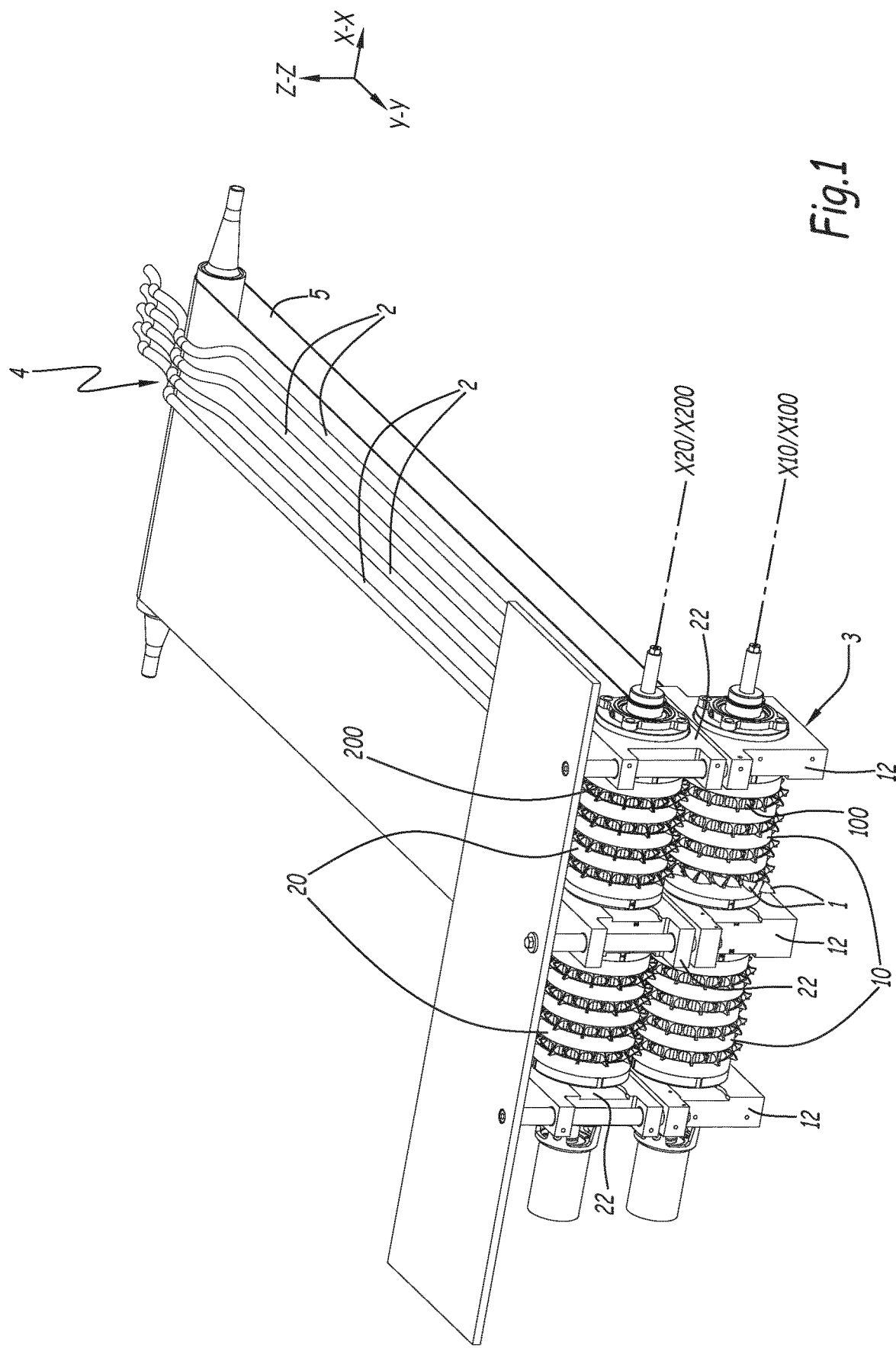

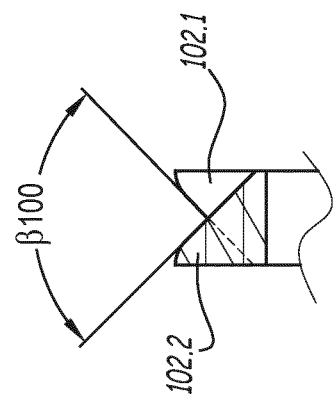
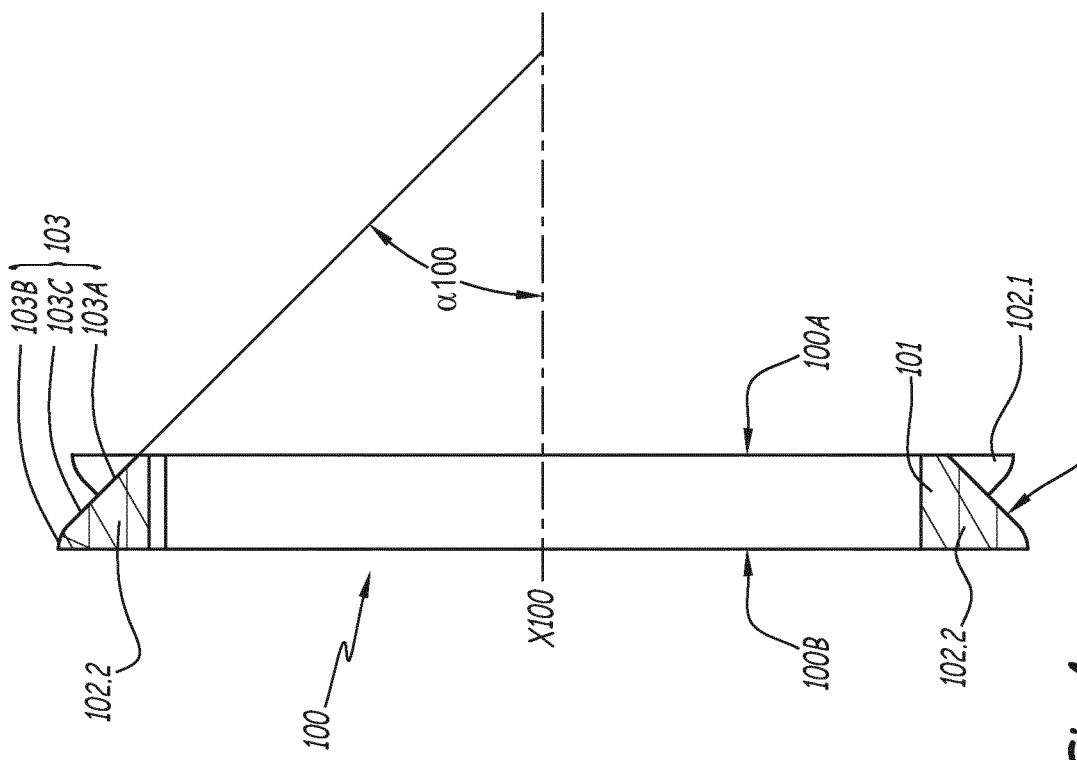

PINCHING-SHAPING DEVICE, AND SYSTEM FOR CONTINUOUS PRODUCTION OF FOODS PRODUCTS CO-EXTRUDED IN POUCH FORM

CROSS-REFERENCE TO RELATED APPLICATIONS

This application is the U.S. national phase of International Application No. PCT/EP2019/079820 filed Oct. 31, 2019 which designated the U.S. and claims priority to FR 1860134 filed Nov. 2, 2018, the entire contents of each of which are hereby incorporated by reference.

BACKGROUND OF THE INVENTION

Field of the Invention

The present invention relates to a pinching-shaping device. It also relates to a system for the continuous production of berlingot-shaped co-extruded food products, comprising a pinching-shaping device.

Description of the Related Art

In the field of human and animal food, it is known to offer extruded products, i.e. products manufactured by extrusion. One speaks about co-extruded products when, at the exit of the extrusion machine, the products are made up of an external tubular envelope which is filled with a generally paste like filling. The outer shell of these co-extruded products is often made from cereal based flour. Such co-extruded products are marketed, for example, as breakfast cereals, children's snacks, aperitifs, animal treats, etc.

These products are obtained from a co-extruded strand of food material, to which a pinching-shaping operation is applied in order to individualize them along the strand, giving them a predetermined geometric shape and separating them at least partially from each other. This pinching-shaping operation is carried out by means of an ad hoc device, often called a "pinching-shaping device" in the field, at the entrance of which the strand is introduced and at the exit of which the individualized products are recovered. The invention is more specifically concerned with a pinching-shaping device which include one or more pairs of parallel cylindrical tools, the tools of each pair being applied tangentially the one against the other so as to pinch-shape between their outer periphery a strand introduced tangentially between them when they are rotated on themselves in opposite directions.

In a different field, namely the shaping of a strip of dough, especially a strip of lasagne dough, U.S. Pat. No. 4,780,329 discloses a shaping device, comprising two superimposed rotating tools, namely an upper and a lower tool. Each of these upper and lower tools comprises two adjacent coaxial wheels, i.e. a left wheel and a right wheel. Each of the four wheels is provided, on its outer periphery, with radially projecting blades, separated in pairs by grooves. Each of the blades of each wheel presents, on its free edge radially opposite the central axis of the wheel, an inclined surface whose top is connected to the rest of the wheel by a side edge radially extending to the central axis. Each time one of the blades of one of the upper and lower tools is, during rotation of the tools, radially interposed between these two tools, this blade is both (i) engaged without contact between two blades of the corresponding side wheel of the other tool and (ii) aligned with one of the blades of the opposite side wheel of the other tool, with axial contact of the respective side edges of these two blades. The action of this shaping device on a strip of dough results in shearing a center line of the strip to form slits along this center line, while marking corrugations on either side of this center line.

SUMMARY OF THE INVENTION

The object of the present invention is to offer a pinching-shaping device that makes it possible to obtain new product shapes in a simple and economical manner from a strand.

For this purpose, the object of the present invention is a pinching-shaping device, comprising at least one pair of tools that are cylindrical, each tool presenting a central axis around which the corresponding tool is adapted to be rotated. The tools of the or each pair of tools are arranged such that the respective central axes of the tools are substantially parallel and the respective outer peripheries of the tools are applied tangentially against each other to pinch-shape a strand inserted tangentially between the tools when the tools are rotated. The outer periphery of each tool is provided with blades, which radially protrude, which are successively distributed around the corresponding central axis and which each provide, on their free edge radially opposite to the central axis, a pinching surface extending between first and second ends of the pinching surface which are opposite to each other along the central axis, the respective first ends of the pinching surfaces of each tool being all located on a same first axial side of the tool, while the respective second ends of the pinching surfaces of each tool are all located on a same second axial side of the tool, opposite to the first axial side along the corresponding central axis. The pinching surface of each blade of each tool runs inclined with respect to the corresponding central axis between the first end and the second end of the pinching surface. The blades of each tool are distributed along the outer periphery of the tool alternately between at least one first blade, the pinching surface of which has its first end radially further from the corresponding central axis than its second end, and at least one second blade, the pinching surface of which has its second end radially further from the corresponding central axis than its first end, so that each time one blade amongst the blades of a first of the two tools of the or each pair of tools is radially interposed between the two tools during the rotation of the two tools around their central axis, said one blade of the first tool is radially aligned with one of the blades of the second tool, the pinching surface of which is inclined in a complementary manner to the pinching surface of said one blade of the first tool, in order to pinch between the respective pinching surfaces of the two blades thus aligned a strand inserted tangentially between the two tools.

Another object of the invention is a system for the continuous production of berlingot-shaped co-extruded food products, comprising:
- a continuous supply of at least one co-extruded food strand, and
- a pinching-shaping device as defined above, which comprises as many pair(s) of tools as there is/are co-extruded food strand(s), each strand being intended to be inserted tangentially between the respective outer peripheries of the tools of the corresponding pair of tools.

Thanks to the inclination of the complementary pinching surfaces provided on the blades of the tools, and thanks to the alternation of this inclination along the outer periphery of the tools, the pinching-shaping device of the invention makes it possible to pinch a strand in several successive zones along the strand, which are each inclined with respect to the respective parallel central axes of the tools, and where the orientation of their inclination alternates between two successive pinching zones: each new pinch zone is thus angularly offset from the previous pinch zone, which gives the individualized product between these two pinch zones a berlingot shape. It should be noted that the berlingot shape is a tetrahedron and is known per se, especially for eponymous French candies: in the confectionery field, it is known to obtain the berlingot shape thanks to a machine which comprises two horizontal tangential toothed wheels, between which a candy cane sugar strand is introduced to be pinched horizontally in a succession of zones along the strand, and two vertical tangential toothed wheels which apply a vertical pinch between two horizontal pinches applied by the horizontal toothed wheels on the strand. This type of machine requires four pinching-shaping tools for each strand, which makes it expensive and cumbersome and therefore unsuitable for continuous production lines for food products from several adjacent co-extruded strands coming out of the same extrusion machine. The pinching-shaping device in accordance with the invention makes it possible to process each strand, in order to subdivide it into berlingot-shaped products, with only one pair of tools, in particular arranged one above the other, which is particularly efficient and economical, while at the same time making it possible to finely adjust the pinching pressure applied to the strand by the pinching surfaces provided by the tool blades. Furthermore, by playing on the inclination of the pinching surfaces of the two tools of the same pair, the invention makes it possible to obtain products with original berlingot shapes, in which the pinch lines provided at both ends of the product can either be rigorously at 90° from each other or be angularly offset by less than 90°. Other aspects of the pinching-shaping device conforming to the invention, which will be detailed later, reinforce its interest and relevance in the field of continuous production of co-extruded food products, possibly from several adjacent strands coming out of the same extrusion machine.

According to additional advantageous features of the pinching-shaping device according to the invention:
- the pinching surface of each blade of each tool extends between its first end and its second end forming with the corresponding central axis an angle of inclination which is between 30° and 60°;
- the angle of inclination is equal to 45°;
- for each tool the angle of inclination has the same value for all the pinching surfaces of the tool;
- for each tool, the angle of inclination changes its value between the respective pinching surfaces of two successive blades;
- for each tool the respective pinching surfaces of two successive blades are angularly offset with respect to each other by an offset angle which is between 45° and 110°;
- the offset angle is equal to 90°;
- each blade of one and/or the other tool of the or each pair of tools is provided with a rib, which radially protrudes from the corresponding pinching surface, which presents a smaller orthoradial dimension than the orthoradial dimension of the pinching surface, and which extends between the first and second ends of the pinching surface;
- each pinching surface has its end, among its first and second ends, the furthest radially from the corresponding central axis, which is blunt;
- the pinching-shaping device further comprises at least one scraper, which is adapted to scrape the outer periphery of one of the tools of the or each pair of tools and which incorporates at least one blowing nozzle arranged to project a gas flow both tangentially to the outer periphery of the tool and transversely to the blades of the tool;
- at least one of the tools of the or each pair of tools is provided with:
  - on the first axial side, a first side flange which borders the respective first ends of the pinching surfaces of the corresponding tool over the entire outer periphery of the tool, and
  - on the second axial side, a second side flange which borders the respective second ends of the pinching surfaces of the corresponding tool over the entire outer periphery of the tool;
- each of the blades of each tool of the or each pair of tools presents two flanks, which are located on either side, in an orthoradial direction to the corresponding central axis, of the blade and which progressively diverge from each other both when the blade is radially scrolled from its pinching surface towards the corresponding central axis and when the blade is axially scrolled from the end of the pinching surface, which is the least radially distant from the corresponding central axis, to the opposite end of the pinching surface, which is the most radially distant from the corresponding central axis;
- at least one of the tools of the or each pair of tools is provided with:
  - on its first axial side, a first lateral crown an outer face of which is inscribed in an axial extension of the axial ends of the tabs of the corresponding tool, located on the first axial side, and
  - on its second axial side, a second lateral crown an outer face of which is inscribed in an axial extension of the axial ends of the tabs of the corresponding tool, located on the second axial side of the corresponding tool.

BRIEF DESCRIPTION OF THE DRAWINGS

The invention will be better understood by reading the description that follows, given only as an example and made with reference to the drawings on which:

FIG. 1 is a perspective view of a continuous production system for co-extruded food products, including a pinching-shaping device conforming to the invention;

FIG. 4 is a sectional view according to the line IV-IV of FIG. 2;

FIG. 5 is a diagram illustrating the geometrical superposition of two distinct parts of the tool in FIG. 2;

DESCRIPTION OF THE PREFERRED EMBODIMENTS

Figure 3:
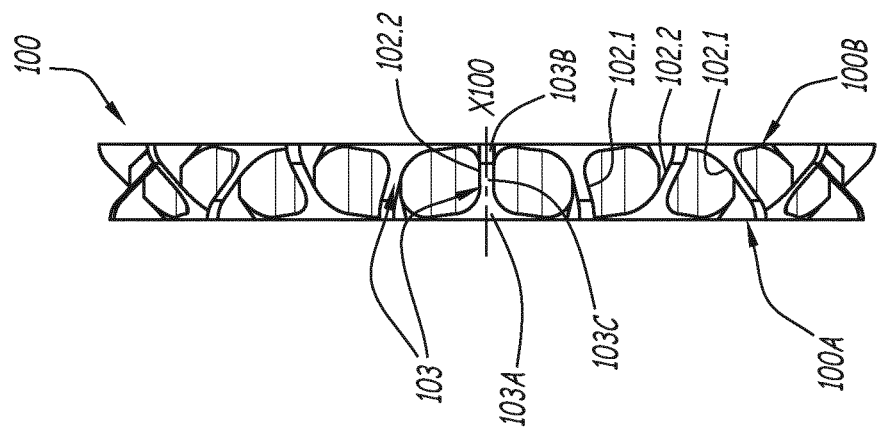
FIG. 3 is an elevation view according to the arrow III of FIG. 2.

FIG. 1 shows a system for the continuous production of co-extruded food products 1 in the shape of a berlingot. This system makes it possible to introduce, from one or more parallel co-extruded food strands 2, the berlingot-shaped products 1. For this purpose, this system includes a pinching-shaping device 3, which allows to apply a pinching-shaping on the strands 2 to obtain the berlingot-shaped products 1 and which will be detailed later, as well as a continuous feed 4 allowing to feed continuously the pinching-shaping device 3 by the strands 2.

For convenience, the rest of the description is oriented in reference to an orthogonal reference of axes referenced respectively X-X, Y-Y and Z-Z, as shown especially in FIG. 1. In practice, in an operating configuration of the production system in FIG. 1, the X-X and Y-Y axes define a horizontal plane, while the Z-Z axis extends vertically.

The strands 2, which in the embodiment example of FIG. 1 are four in number, are strands of food materials, resulting from an extrusion method, known per se and not limiting the invention. The specific features of the strands 2 are not restrictive of the invention as long as these strands have a co-extruded structure, consisting of an outer tubular envelope, generally based on cereal flours, filled with a paste-like food. In practice, the strands 2 can come from the same extrusion machine, equipped with a suitable outlet die, the strands 2 then being arranged next to each other, at a short distance from each other, as shown in FIG. 1.

In addition to the strands 2, the continuous feeder 4 comprises all suitable means for continuously transporting the strands 2 from the outlet of an extrusion machine to the pinching-shaping device 3. In the example shown in FIG. 1, the continuous feeder 4 comprises a conveyor belt 5 for this purpose, which is driven by a special motor, not shown.

As shown in FIG. 1, the pinching-shaping device 3 comprises adjacent parallel rollers 10 and 20, between which the strands 2 are inserted tangentially for pinch separation, as described in detail below. In the planned operating configuration shown in FIG. 1, the rollers of the pinching-shaping device 3, between which the strands 2 are inserted, each extend horizontally and are vertically superimposed, i.e. arranged in alignment along the Z-Z axis. More precisely, in the embodiment example of FIG. 1, the pinching-shaping device 3 has two lower rollers 10, which are coaxial and are centered on an axis X10 extending along the X-X axis, and two upper rollers 20, which are coaxial and are centered on an X20 axis extending along the X-X axis, with the X10 and X20 axes aligned with each other along the Z-Z axis. Along the Z-Z axis, between each of the lower rollers 10 and one of the upper rollers 20, located vertically plumb, a passage is delimited, inside which the strands 2, which extend lengthwise along this Y-Y axis, are introduced along the Y-Y axis, and in which the strands 2 undergo the pinching-shaping operation to obtain the berlingot-shaped products 1, as explained in more detail below. It should be noted that in FIG. 1, for reasons of visibility, only one of the four strands 2 feeding the pinching-shaping device 3 is shown as leading to the production of berlingot-shaped products 1, it being understood that, in reality, the three other strands 2 feeding the pinching-shaping device 3 also give rise, at the output of this device, to the production of berlingot-shaped products 1.

In order to carry out the pinching-shaping operation, the lower rollers 10 are rotated around the axis X10 and the upper rollers 20 are rotated around the axis X20, turning in the opposite direction to the lower rollers 10. For this purpose, the lower rollers 10 and the upper rollers 20 can be driven by an ad hoc motorization of the pinching-shaping device 3, not shown in the figures. The spacing between the lower rollers 10 and the upper rollers 20 along the Z-Z axis is controlled, advantageously in an adjustable manner, by support elements 12 and 22 of the pinching-shaping device 3, which support the lower rollers 10 and the upper rollers 20 respectively, while allowing the latter to rotate about their axes X10 and X20. In an optional advantageous embodiment, the pinching-shaping device 3 incorporates a motorization, not shown, acting on the relative positioning, along the Z-Z axis, of the support elements 12 and 22, in order to adjust the spacing along the Z-Z axis between the lower rollers 10 and the upper rollers 20. The specific features of the pinching-shaping device 3 relating to the relative arrangement and drive of the rollers 10 and 20 are not limiting the invention.

To pinch-shape each of the strands 2, the pinching-shaping device 3 comprises a pair of tools, each related to a lower tool 100, carried by one of the lower rollers 10, and an upper tool 200, carried by one of the upper rollers 20. To process the individual strands 2, the pinching-shaping device 3 comprises several pairs of tools 100 and 200, which are identical to each other, only one pair of these tools being detailed below. In the example of the embodiment shown in FIG. 1, the pinching-shaping device 3 comprises as such, eight pairs of tools, four of which are related to the four strands 2 feeding the pinching-shaping device. The tool 100 and tool 200 are described in detail in the following, followed by a description of the relative arrangement of tools 100 and 200.

Figure 2:
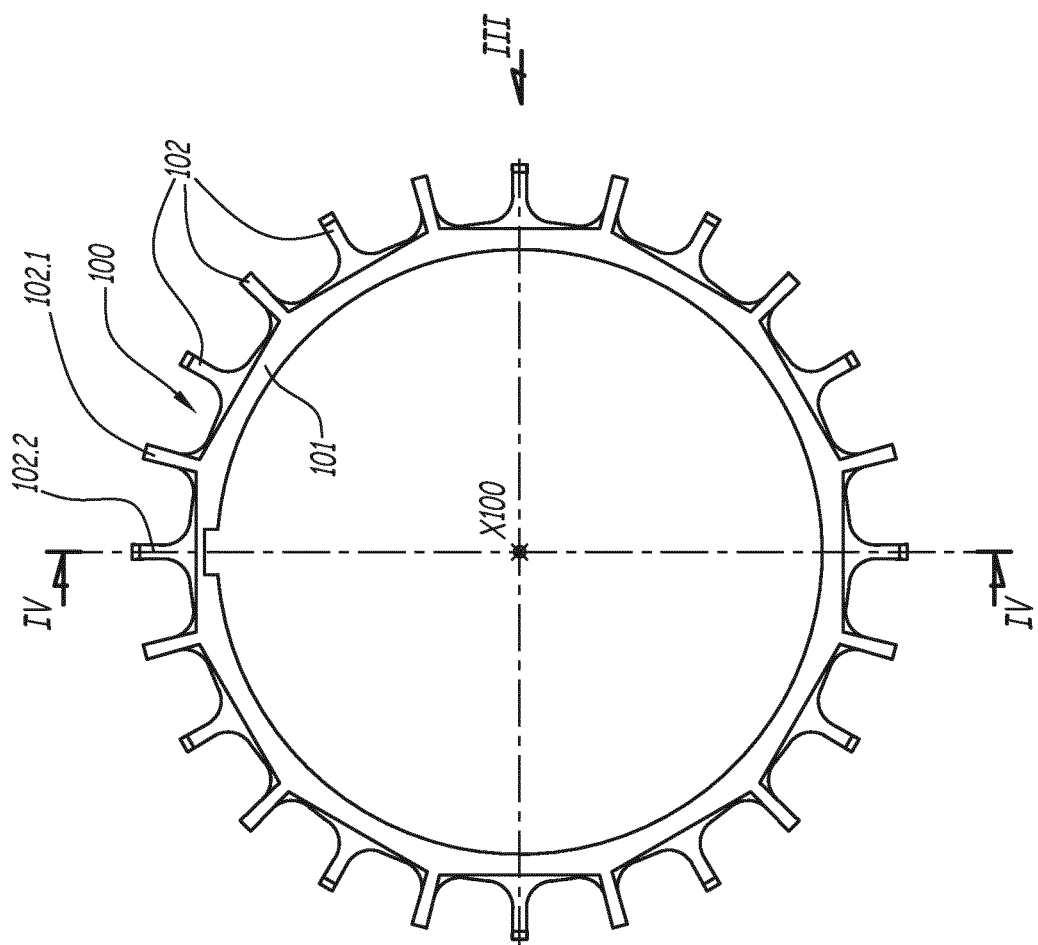
FIG. 2 is an elevation view of a first tool of a pair of tools belonging to the pinching-shaping device of FIG. 1.

The tool 100, which is shown alone in FIGS. 2 to 4, has a generally cylindrical shape, centered on an axis X100. Specifically, the tool 100 comprises a cylindrical body 101, which has a circular base and is centered on the axis X100. The cylindrical body 101 is adapted to be attached integrally to one of the lower rollers 10, so as to align the axis X100 with the axis X10 and so as to rotate the tool 100 with the lower roller 10: the corresponding arrangements of the cylindrical body 101 are not limiting the invention, these arrangements can for example be provided on the inner face of the cylindrical body 101.

The tool 100 also comprises radially projecting blades 102 on its outer periphery. As can be seen in FIGS. 2 and 4, each of the blades 102 extends from the cylindrical body 101, radially projecting to the axis X100 from the outer face of this cylindrical body 101. The blades 102, which in the example considered here are twenty-four in number, are successively distributed around the axis X100, advantageously in a regular manner. Opposite its junction zone with the cylindrical body 101, each blade 102 presents a free edge, which is radially opposite to the axis X100 and which provides a pinching surface 103. As can be seen in FIGS. 3 and 4, each pinching surface 103 includes two ends 103A and 103B, which are opposite to each other along the axis X100 and which are connected to each other by a running part 103C of the pinching surface 103, being noticed that the respective ends 103A of all the pinching surfaces 103 are located on the same axial side 100A of the tool 100, while the respective ends 103B of all the pinching surfaces 103 are located on the same axial side 100B of the tool 100, opposite to the axial side 100A along the axis X100. As can be seen in FIGS. 3 and 4, the respective ends 103A of all the pinching surfaces 103 are all located at the same level on the axis X100, while the respective ends 103B of all pinching surfaces 103 are all located at the same level on the axis X100. In other words, a first geometrical plane, perpendicular to the axis X100, passes through all the respective ends 103A of all the pinching surfaces 103, and a second geometrical plane, perpendicular to the axis X100 and axially offset from the above-mentioned first plane, passes through all the respective ends 103B of all the pinching surfaces 103.

As can be seen in FIGS. 3 and 4, the respective running parts 103C of the pinching surfaces 103 are not parallel to the axis X100, but are inclined with respect to this axis. In other words, each pinching surface 103 extends, between its ends 103A and 103B, inclined with respect to the axis X100, forming with the latter an angle of inclination noted α100 in FIG. 4. In the example of the embodiment considered here, the angle α100 is 45° but, for reasons that will appear later, this value of 45°, which may be preferential, is not limiting, as the value of the angle α100 may advantageously be comprised between 30° and 60°.

Furthermore, as can be seen in FIGS. 2 and 3, the orientation of the inclination of the pinching surfaces 103 is not the same for all blades 102, but alternates from one blade to another around the axis X100. In other words, the blades 102 are distributed alternately, along the outer periphery of the tool 100, between the blades 102.1, so each pinching surface 103 has its end 103A which is radially further from the axis X100 than its end 103B, and the blades 102.2, so each pinching surface 103 has its end 103B which is radially further from the axis X100 than its end 103A. Thus, along the outer periphery of the tool 100, one of the blades 102.1, the pinching surface 103 of which is inclined towards the axis X-X when it is traversed from its end 103A to its end 103B, succeeds one of the blades 102.2, the pinching surface 103 which is inclined towards the axis X100 when it is traversed from its end 103B to its end 103A, and so on. This means that the angle α100 related to blades 102.1 is, as it were, of opposite sign to the angle α100 related to blades 102.2. In the example of the embodiment considered in the figures, the blades 102.1 are twelve and are identical to each other, and the blades 102.2 are twelve and are identical to each other, the angle α100 related to the blades 102.1 having the same absolute value as the angle α100 related to the blades 102.2.

The alternating inclination of the pinching surfaces 103 implies that the pinching surface 103 of each of the blades 102.1 is angularly offset from the pinching surface 103 of each of the blades 102.2, as shown schematically in FIG. 5 on which one of the blades 102 is superimposed. 1, drawn in solid lines in section in a plane containing the axis X100 and passing through this blade 102.1, and one of the blades 102.2, drawn partially in dotted lines in section in a plane containing the axis X100 and passing through this blade 102.2. The offset angle between the respective pinch surfaces 103 of each blade 102.1 and each blade 102.2 is noted β100 in FIG. 5. In the example of the embodiment considered here, the angle β100 is 90° but, for reasons that will appear later, this value of 90°, which may be preferential, is not limiting, as the value of the angle β100 may advantageously be comprised between 45° and 110°.

The tool 200, which is shown alone in FIGS. 6 to 9, can be described in exactly the same terms as those used to describe the tool 100, so the description of the tool 200 will be shortened by referring to the detailed description of Tool 100 above.

In particular, the tool 200 presents a generally cylindrical shape, centered on an axis X200, and presents two opposite axial sides 200A and 200B. The tool 200 comprises a cylindrical body 201, which is structurally identical to the cylindrical body 101, but differs functionally from the latter in that the cylindrical body 201 is adapted to be attached to and rotationally connected to one of the upper rollers 20 of the pinching and forming device 3, aligning the axis X200 with the axis X20. In addition, the outer periphery of the tool 200 is provided with a succession of blades 202 which are structurally similar to the blades 102: each of the blades 202 has, on its free edge, radially opposite to the axis X200, a pinching surface 203 the running part 103C of which, connects its ends 203A and 203B opposite to each other along the axis X200, extends in an inclined manner with respect to the axis X200, forming with the latter an angle of inclination α200. In addition, as with the blades 102, the blades 202 are divided into blade 202.1 and blade 202.2, which alternate along the outer periphery of the tool 200 and the respective pinching surfaces 103 which are respectively inclined in opposite orientations: the respective ends 203A of the pinching surfaces 203 of the blade 202.1 are radially further away from the axis X200 than the end 203B of the pinching surfaces 203 of the blade 202.1, whereas the respective ends 203B of the pinching surfaces 203 of the blade 202.2 are radially further from the axis X200 than the respective ends 203A of the pinching surfaces 203 of these blades 202.2, it being noted that the ends 203A of all the blades 202 are located on the axial side 200A of the tool 200 whereas the ends 203B of all the blades 202 are located on the axial side 200B of this tool.

The considerations developed above regarding the possible value of the angle of inclination α100 apply to the angle of inclination α200. Similarly, the considerations developed above for the offset angle β100 also apply to a similar offset angle for the blades 200, which is not shown in the Figures but results from the angular offset between the pinching surface 203 of each of the blades 202.1 and the pinching surface 203 of each of the blades 202.2.

Figure 7:
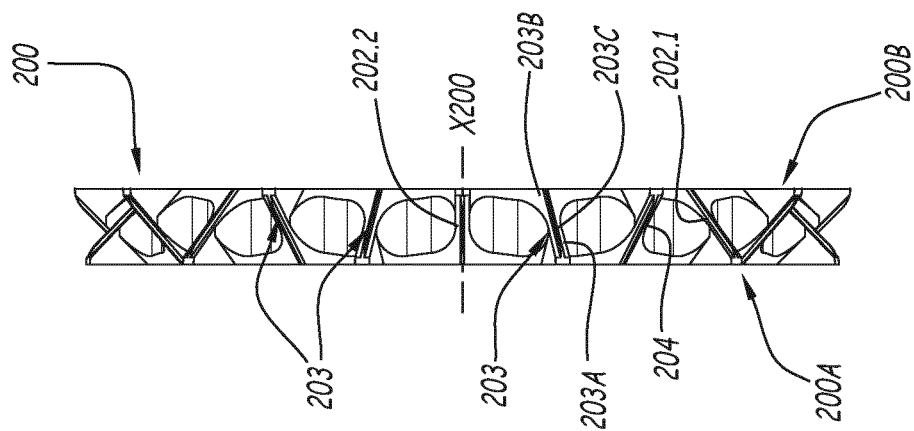
FIG. 7 is an elevation view according to the arrow VII of FIG. 6.
Figure 6:
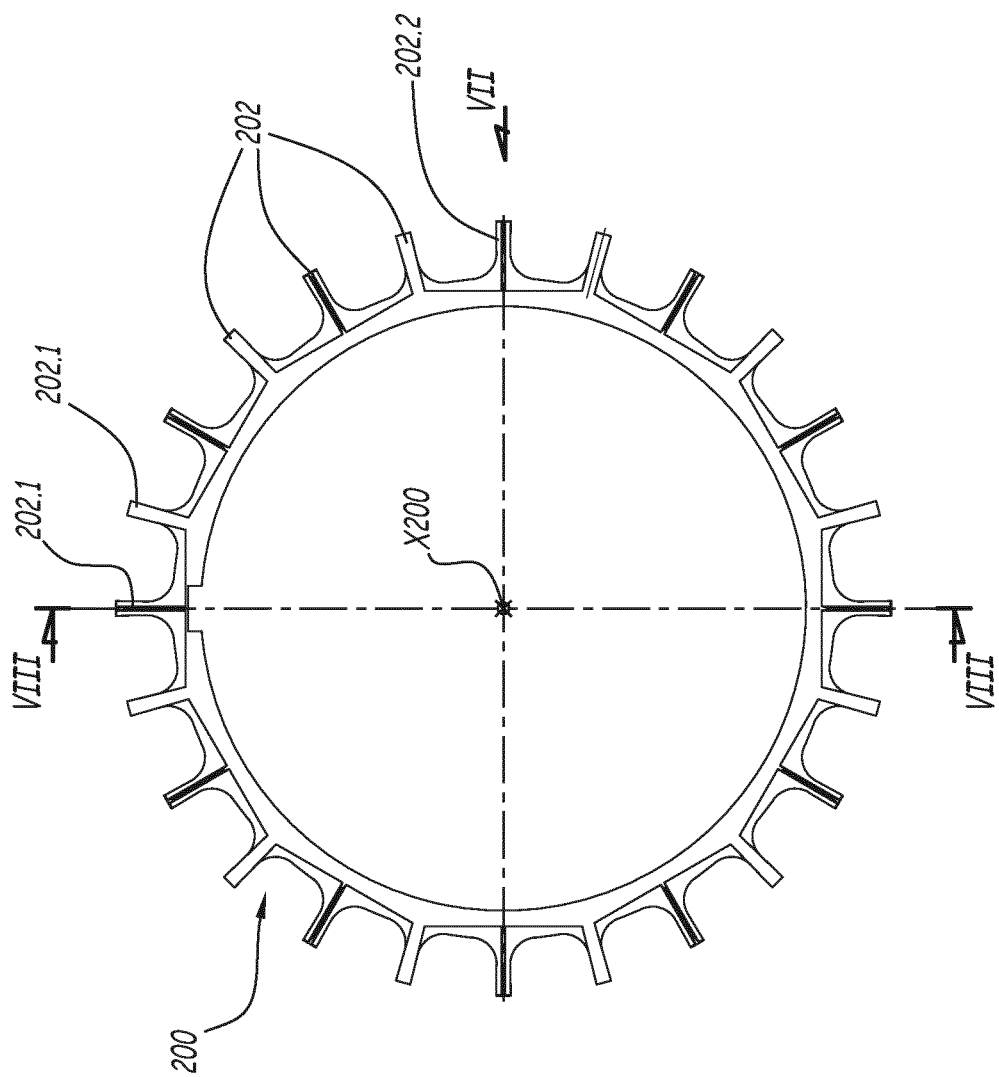
FIG. 6 is an elevation view similar to FIG. 2, but of the second tool of the pair of tools belonging to the pinching-shaping device of FIG. 1.
Figure 9:
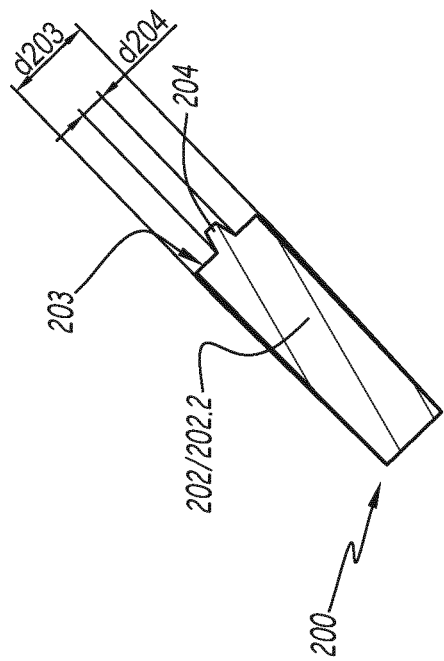
FIG. 9 is a sectional view according to the line IX-IX of FIG. 8.
Figure 8:
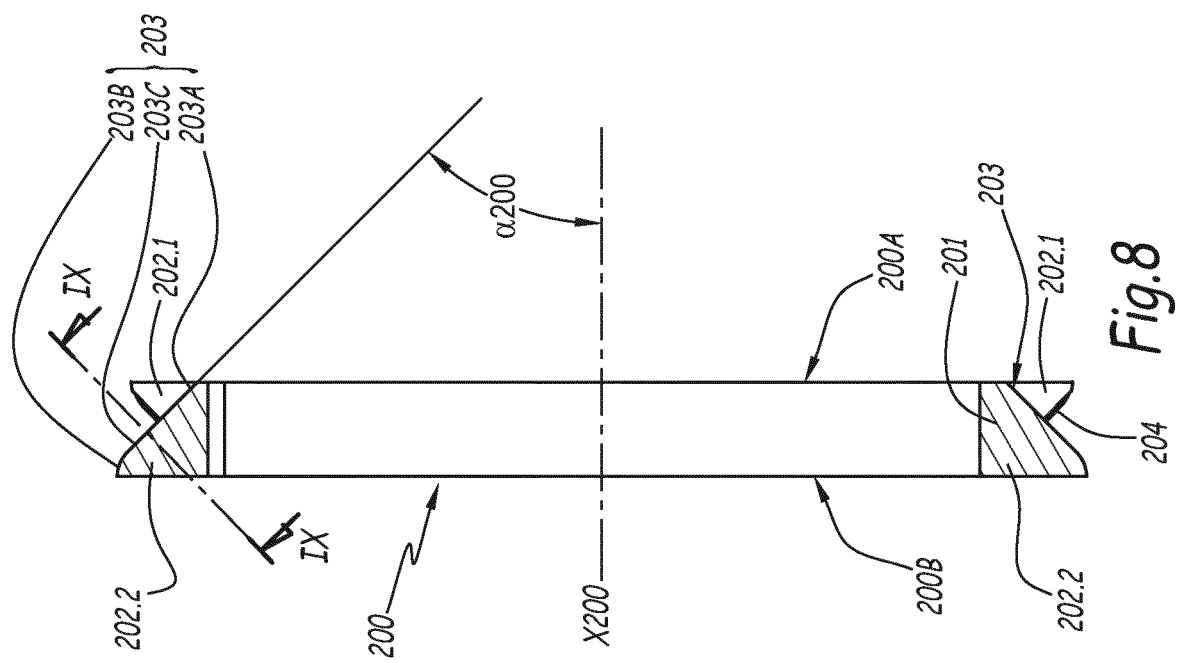
FIG. 8 is a sectional view according to the line VIII-VIII of FIG. 6.

In the example of the embodiment shown here, the tool 200 differs from the tool 100 by an advantageous optional arrangement, i.e. each of the blades 202 is provided with a rib 204 that, as can be seen in FIGS. 7 to 9, protrudes radially from the corresponding pinching surface 203. Each rib 204 extends lengthwise between the ends 203A and 203B of the corresponding pinching surface 203, without completely covering this pinching surface 203 but presenting a dimension orthoradial to the axis X200, noted d204 in FIG. 9, which is less than the orthoradial dimension, noted d203, of the pinching surface 203: in practice, especially so that the pinching effect provided by the pinching surfaces 203 remains effective in the presence of the ribs 204, the dimension d204 of the ribs 204 is limited, being typically equal to or less than half of the dimension d203, and the ribs 204 occupy, on the corresponding pinching surface 203, a median position in a direction orthoradial to the axis 200.

Figure 11:
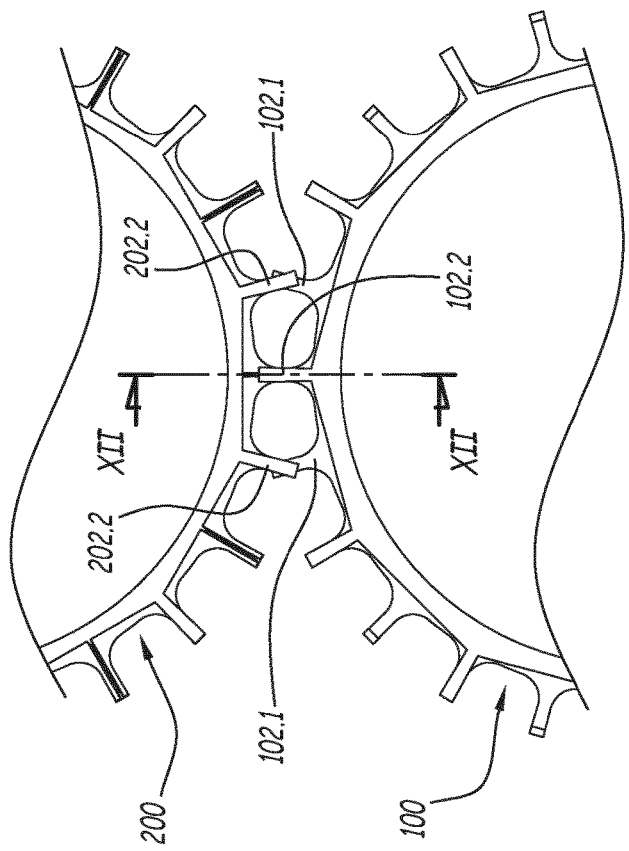
FIG. 11 is an elevation view according to the arrow XI of FIG. 10, showing only a part of the two tools.
Figure 12:
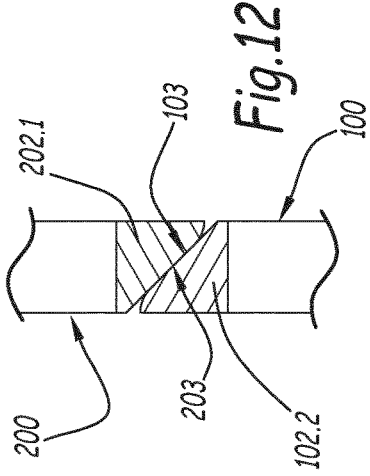
FIG. 12 is a sectional view according to the line XII-XII of FIG. 11.
Figure 10:
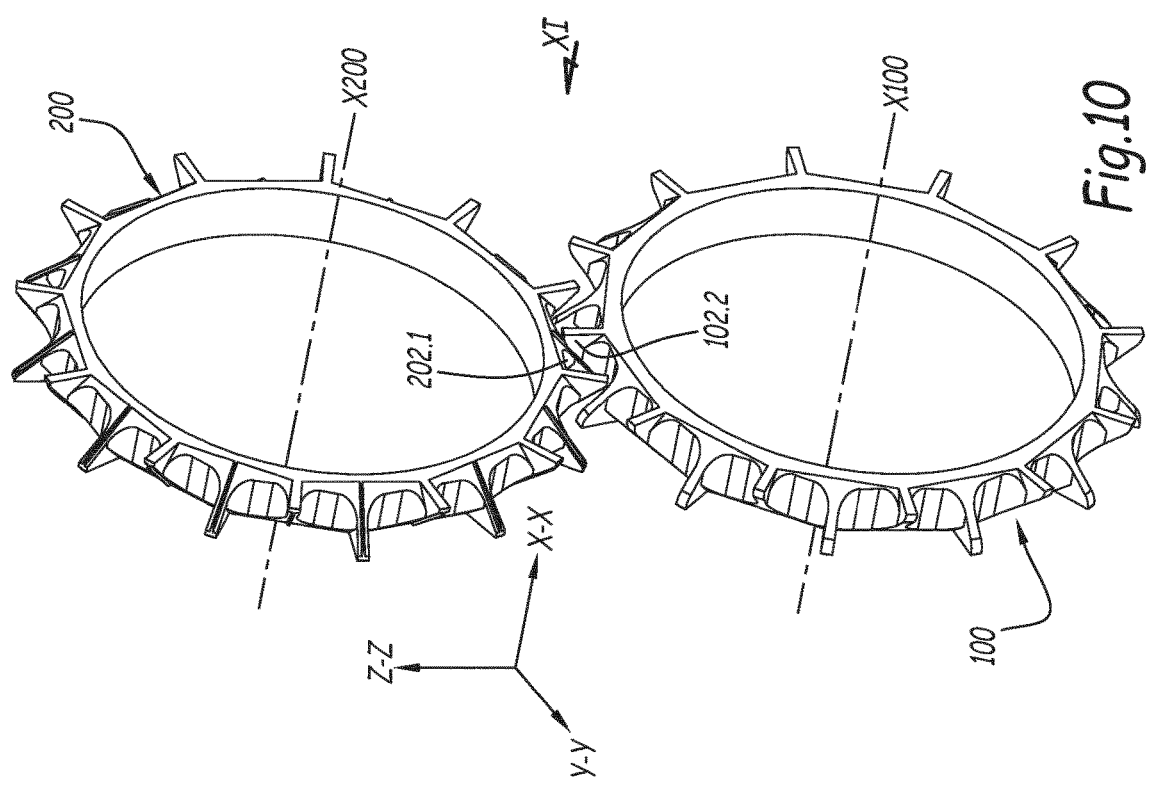
FIG. 10 is a perspective view of the related pair of the tools of FIG. 2 and the tool of FIG. 6, in an operational configuration that this pair of tools occupies within the pinching-shaping device of FIG. 1.

As indicated above, the tools 100 and 200 are related in a pair within the pinching-shaping device 3: this pair is shown alone in FIGS. 10 to 12, in its operating configuration within the pinching-shaping device 3. As can be seen in FIGS. 10 to 12, the tools 100 and 200 are then arranged in such a way that the axes X100 and X200 are parallel to each other, as well as being aligned with each other in the direction of the axis Z-Z, which results from their respective connection to rollers 10 and 20. In addition, the respective outer peripheries of the tools 100 and 200 lie tangentially against each other so that the blades 102 and 202 can interact with each other to pinch-shape the strand 2 inserted tangentially between the tools 100 and 200 when these latter are rotated in opposite directions respectively. More precisely, the tools 100 and 200 are designed so that each time one of the blades 102 or 202 of one of the tools 100 and 200 is radially interposed between the two tools when the latter are rotated about their axes X100 and X200, as shown in FIGS. 10 to 12, this blade 102 or 202 is radially aligned with one of the blades 202 or 102 of the other tool, this blade 202 or 102 of the other tool having its inclined pinching surface 203, 103 which is provided complementary to the pinching surface 103, 203 of the blade 102 or 202 of the tool 100 or 200. It is understood that, for tools 100 and 200 considered here, this implies that, as soon as the respective axial sides 100A and 200A of tools 100 and 200 are turned on the same side along the axis X-X in the pinching-shaping device 3, each of the blades 102.1 of tool 100 is radially aligned with one of the blades 202.2 of tool 200 when the tools are rotated, and each of the blades 102.2 of tool 100 is radially aligned with one of the blades 202.1 of the tool 200 when the tools are rotated, the angles $\alpha 100$ and $\beta 100$ are complementary to each other.

Figure 15:
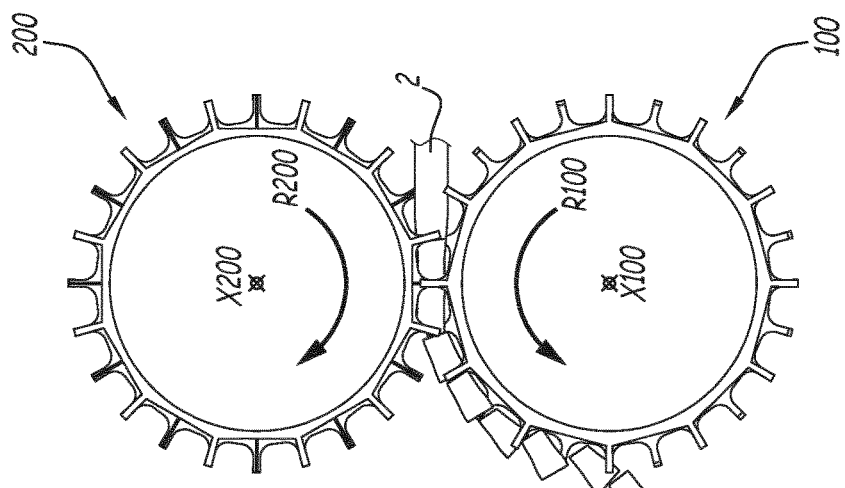
FIGS. 13 to 15 are similar views to FIG. 11, illustrating three successive steps of the operation of the tool pair within the the pinching-shaping device in FIG. 1.
Figure 14:
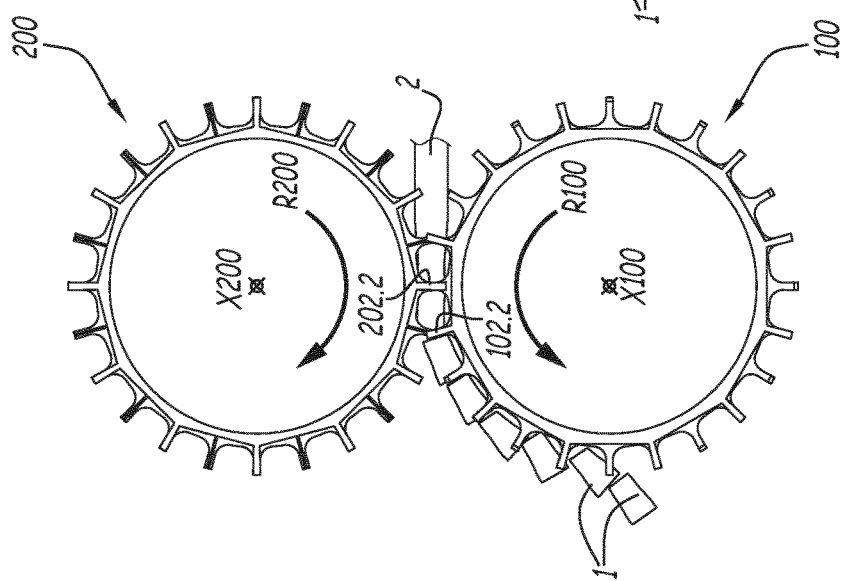
Figure 13:
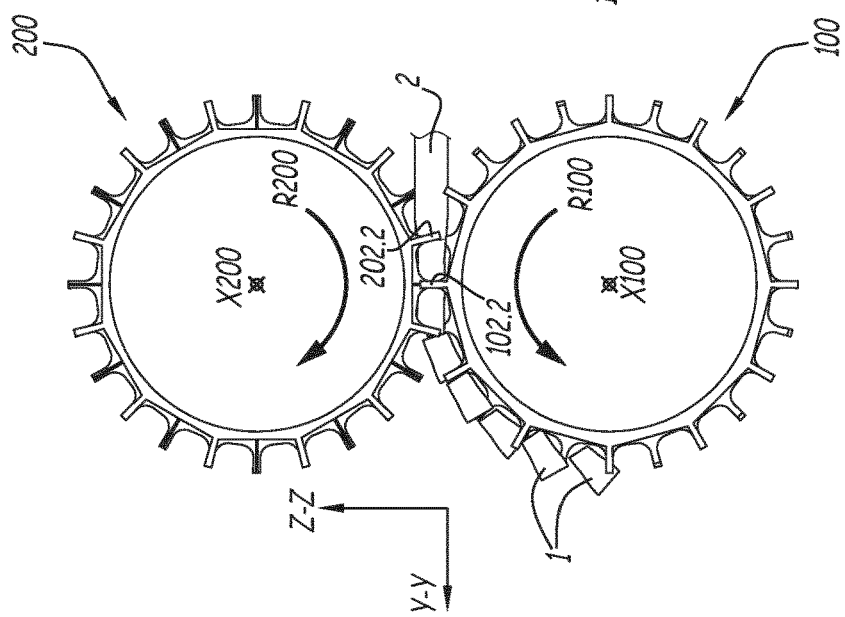

This arrangement of tools 100 and 200 makes it possible to form a berlingot shape, i.e. a tetrahedron shape, for the strand 2 inserted tangentially between the tools 100 and 200, as shown in FIGS. 13 to 15. Indeed, at the operating step illustrated in FIG. 13, the respective blades of tools 100 and 200 that are radially interposed between these tools are one of the blades 202.1 and one of the blades 102.2: this blade 202.1 and this blade 102.2 are radially aligned with each other and the respective pinching surfaces 203 and 103 of these plates 202.1 and 102.2, which are inclined in a complementary manner to each other, pinching the strand 2 between them along a first pinching line inclined with respect to the axes X100 and X200. By means of the rotary drive of tools 100 and 200, as indicated by the arrows R100 and R200 in FIGS. 13 to 15, tools 100 and 200 change from the configuration shown in FIG. 13 to the configuration shown in FIG. 14: between FIGS. 13 and 14, the strand 2 has advanced along the axis Y-Y towards the exit of the pinching-shaping device 3 and, at the same time, the blade 202.1 and 102.2 that pinched the strand between them in the step shown in FIG. 13 were moved away from each other while, at the same time, the next blade of tool 200, i.e. one of the blades 202.2, and the next blade of tool 100, i.e. one of the blades 102.1, are found, in the step illustrated in FIG. 14, radially aligned with each other, with their pinching surfaces 103 and 203, inclined in a complementary manner to each other, which pinch the strand 2 between them along a second pinching line, which is distinct from the first above-mentioned pinching line and which is inclined with respect to the axes X100 and X200, being angularly offset with respect to the first above-mentioned pinching line. Taking into account the explanations given so far, it is understood that the angular offset between the two aforementioned pinch lines of the strand 2 depends directly on the offset angle $\beta 100$ between the two blades 102.2 and 102.1 involved in the pinching of strand 2, and therefore on the similar offset angle between the blade 202.1 and 202.2 involved in the pinching of the strand, it being noted, however, that, in practice, the angular offset between the two aforementioned pinch lines of strand 2 may be influenced by a possible twisting of strand 2 on itself during successive pinches. In any case, by playing on the angles of offset between the blades of tools 100 and 200, the angular offset between the two abovementioned pinch lines of strand 2 can be controlled to either offset these two pinch lines rigorously at 90°, and thus obtain a "traditional" berlingot shape, or to offset these two pinch lines by less than 90°, to obtain a berlingot shape slightly different from the traditional shape. Of course, the precise berlingot shape obtained also depends on the angles of inclination $\alpha 100$ and $\alpha 200$ of the blades 102 and 202 since these angles of inclination condition the inclination of each of the two pinch lines mentioned above with respect to the axes X100 and X200 when forming these pinch lines. Furthermore, rather than the angle of inclination $\alpha 100$, $\alpha 200$ of each tool 100, 200 having the same value for all pinching surfaces 103 and 203 of the tool, as is the case for tools 100 and 200 considered above, this angle of inclination may change value between the respective pinching surfaces of two successive blades, again to influence the final berlingot shape obtained.

In any case, it is understood that at the stage illustrated in FIG. 14, the part of the strand 2, delimited between the two pinch lines mentioned above, forms one of the berlingot-shaped products 1. Then, as shown in FIG. 15, the continued rotation of the tools 100 and 200 leads to the formation of another of the berlingot-shaped products 1 from the strand 2, obtaining a new strand pinch line of the strand between the respective pinching surfaces 103 and 203 of one of the blades 102.2 and one of the blades 202.1.

Advantageously, during the formation of each of the pinch lines of the strand 2 between the pinching surfaces 103 and 203 of blades 102 and 202, the rib 204 of the blade 202 acts on the strand 2 at the pinch line in question: depending on the precise geometrical characteristics of rib 204, the latter can pinch strand 2 more strongly and/or partially or completely cut the strand 2 transversely. The berlingot-shaped products 1 can then be more easily individualized, in particular by separating from each other by spacing the edges of the pre-cut or the cut thus obtained thanks to the ribs 204. It is understood in passing that, as an alternative, not shown, these ribs can not only be provided on one of the two tools 100 and 200, but can also be distributed between these two tools or even be provided on all the blades of both tools.

As an advantageous option, the pinching-shaping device 3 also includes arrangements aimed at improving or facilitating the clearance from the tools 100 and 200 of the berlingot-shaped products 1 once the shaping of the latter has been achieved by these tools.

A first of these arrangements consists in blunting the end of each of the gripping surfaces 103 and 203, the furthest from the axis X100 or X200 of the related tool 100 or 200. Thus, as envisaged in the example of the embodiment considered in the figures, and as more particularly visible in FIGS. 3, 4, 7 and 8, are blunted at the same time the respective ends 103A of the pinching surfaces 103 of the blades 102.1, the respective ends 103B of the pinching surfaces 103 of the blades 102.2, the respective ends 203A of the pinching surfaces 203 of the blades 202.1 and the respective ends 203B of the pinching surfaces 203 of the blades 202.2.

Figure 16:
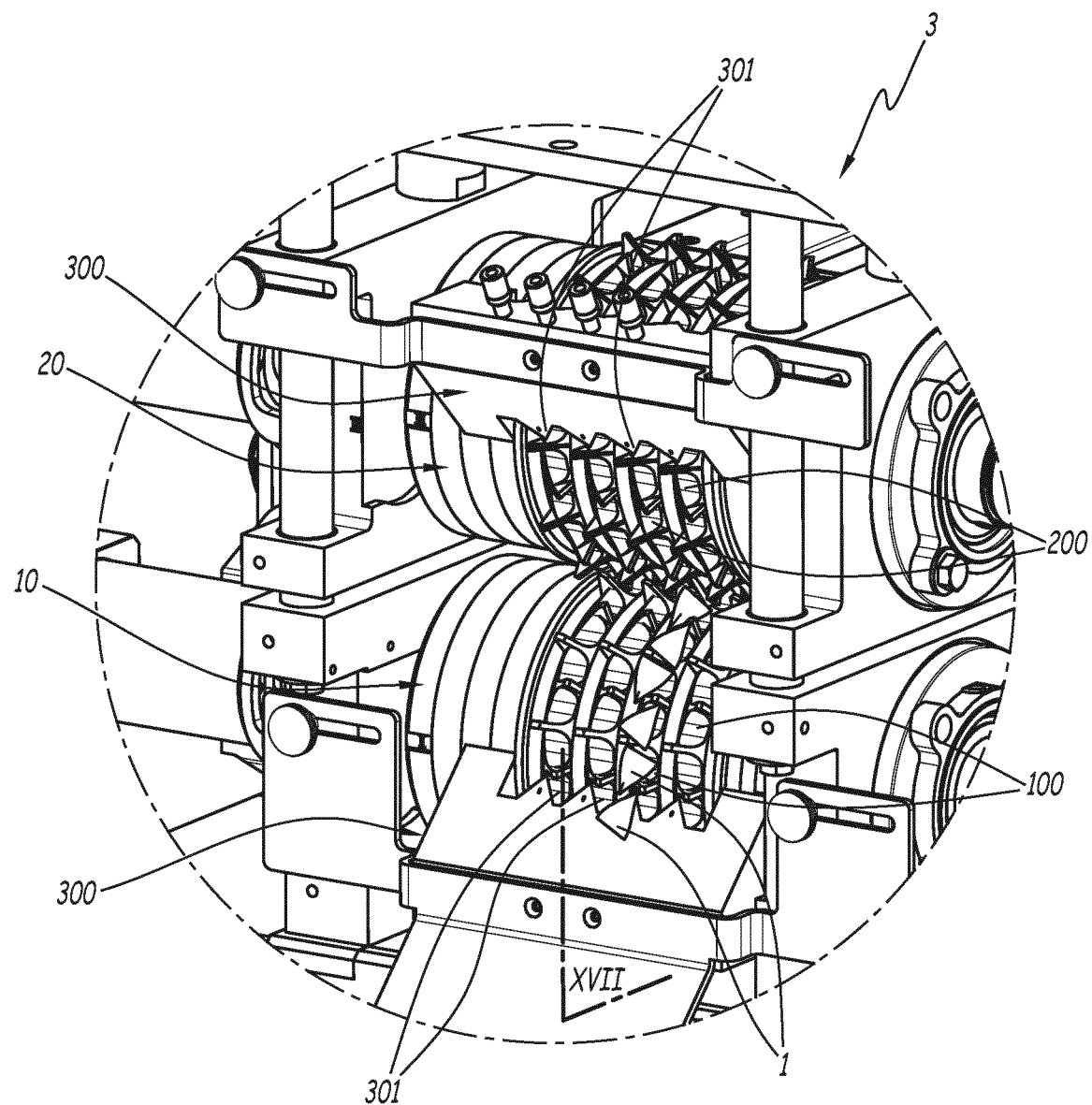
FIG. 16 is a view similar to FIG. 1, showing only part of a variant of the pinching-shaping device according to the invention.
Figure 17:
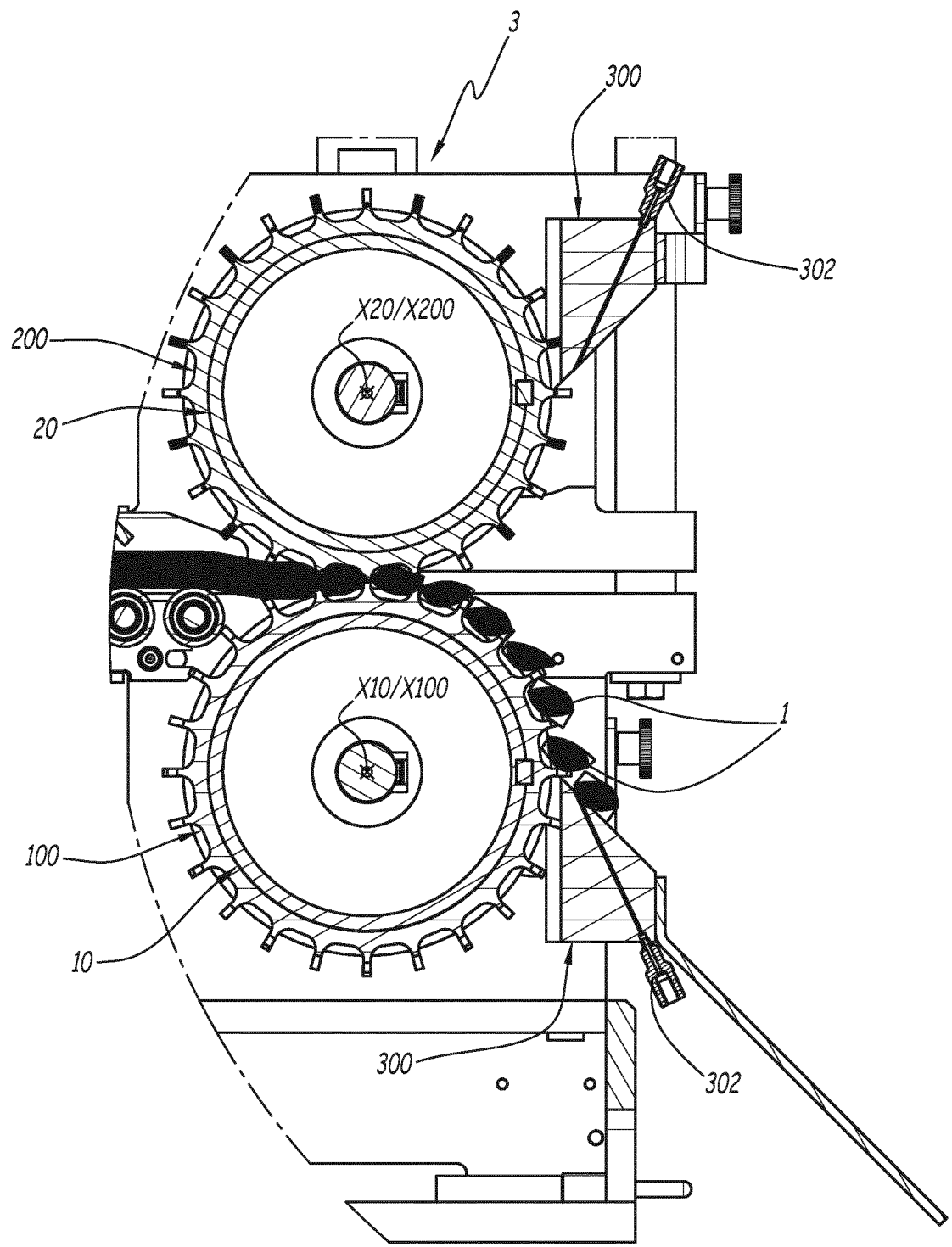
FIG. 17 is a sectional view in the plane XVII of FIG. 16.

A second possible arrangement is shown in FIGS. 16 and 17, in which the pinching-shaping device 3 is completed with scrapers 300 arranged on the side of rollers 10 and 20 according to the axis Y-Y towards the exit of the pinching-shaping device 3. Each scraper 300 is designed to scrape the outer periphery of the tools 100 or 200 by sweeping this outer periphery against the scraper during the rotation of the tools 100 and 200. In practice, on its side turned towards the corresponding tool 100 or 200, each scraper 300 delimits openings 301 for the tangential passage of the blades 102 or 202, these openings 301 being designed to avoid any blocking interference between the scraper 300 and the corresponding tool 100 or 200. Furthermore, each scraper 300 incorporates blowing nozzles 302, each blowing nozzle 302 being related to the tool 100 or 200 against which the scraper 300 is arranged: each of these blowing nozzles 302 is adapted to project a gas flow, typically a flow of compressed air, both tangentially to the outer periphery of the corresponding tool 100 or 200 and transversely to the blades 102 or 202 of this tool, as clearly visible in FIG. 17. If one of the berlingot-shaped products 1 is not or insufficiently released from one of the tools 100 or 200, the gaseous flow projected by the blowing nozzles 302 acts on this berlingot-shaped product 1 to "lift" it from the outer periphery of the tool and, if necessary, this berlingot-shaped product 1 will physically interfere with the scraper 300 to completely release it from the tool.

Figure 18:
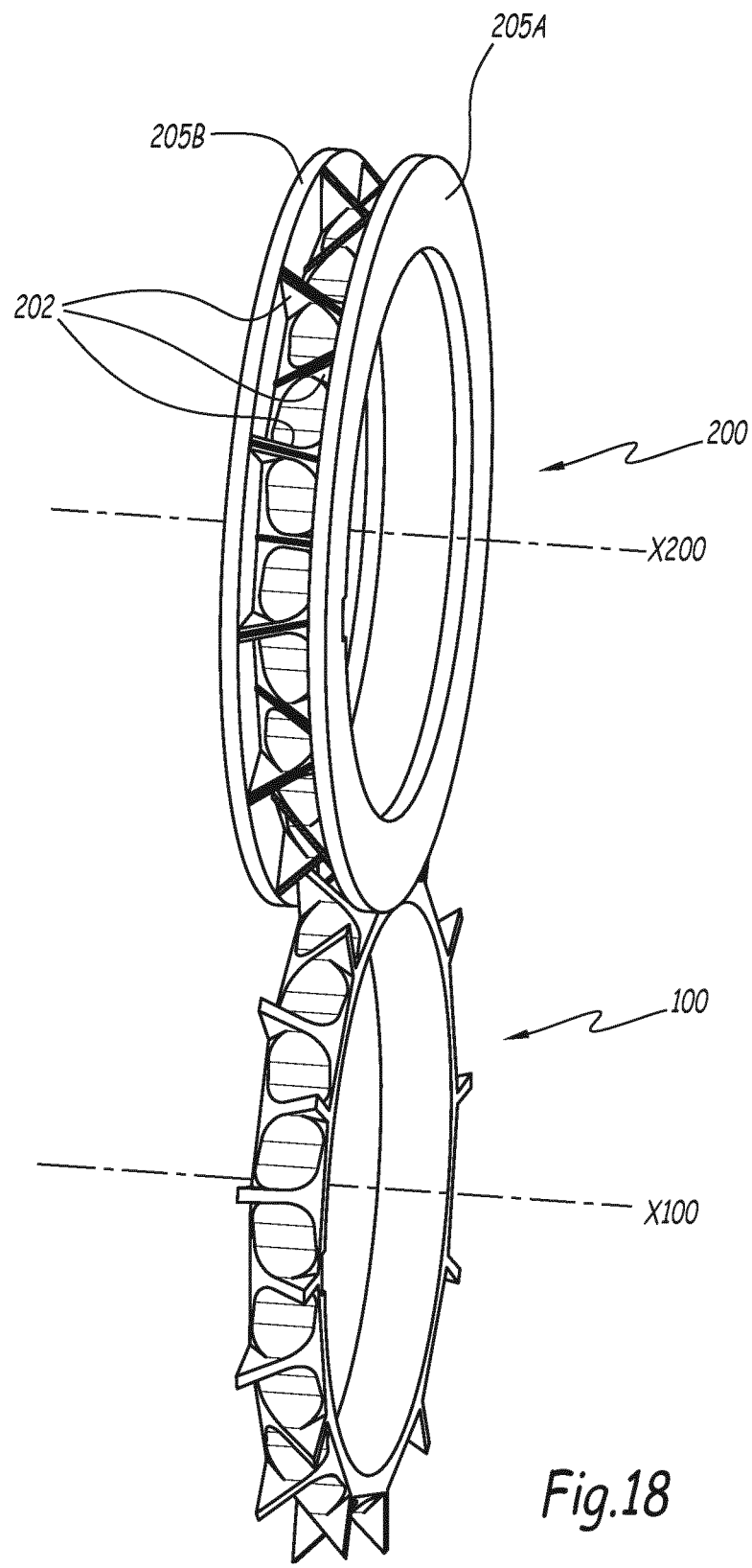
FIG. 18 is a view similar to FIG. 10, showing a variant of the pair of tools belonging to the pinching-shaping device according to the invention.

A third possible arrangement, which is illustrated in FIG. 18, consists in adding, on each of the axial sides of one and/or the other of tools 100 and 200, a lateral flange capable of bordering the corresponding axial ends of the pinching surfaces of the blades of the tool over the entire outer periphery of this latter. Thus, in the example shown in FIG. 18, the tool 200 is provided, on one hand with a side flange 205A on its axial side 200A, which borders the respective ends 203A of the pinching surfaces 203 of the blades 202 along the entire outer periphery of the tool 200, and on the other hand with a side flange 205B on its axial side 200B, which borders the respective ends 203B of the pinching surfaces 203 of the blades 202 along the entire outer periphery of tool 200. These lateral flanges, such as flanges 205A and 205B of the tool 200 in FIG. 18, reinforce the guidance of the strand 2 during its tangential insertion between tools 100 and 200 and during the pinching of the strand by the blades of these tools, thus counteracting a misalignment of the strand and of the pinching surfaces 103 and 203 in the direction of the axis X-X and thus limiting the risk of jamming of the berlingot-shaped products 1 that would result from their poor transverse positioning on the outer periphery of the tools coming out of the pinching-shaping device 3.

Figure 19:
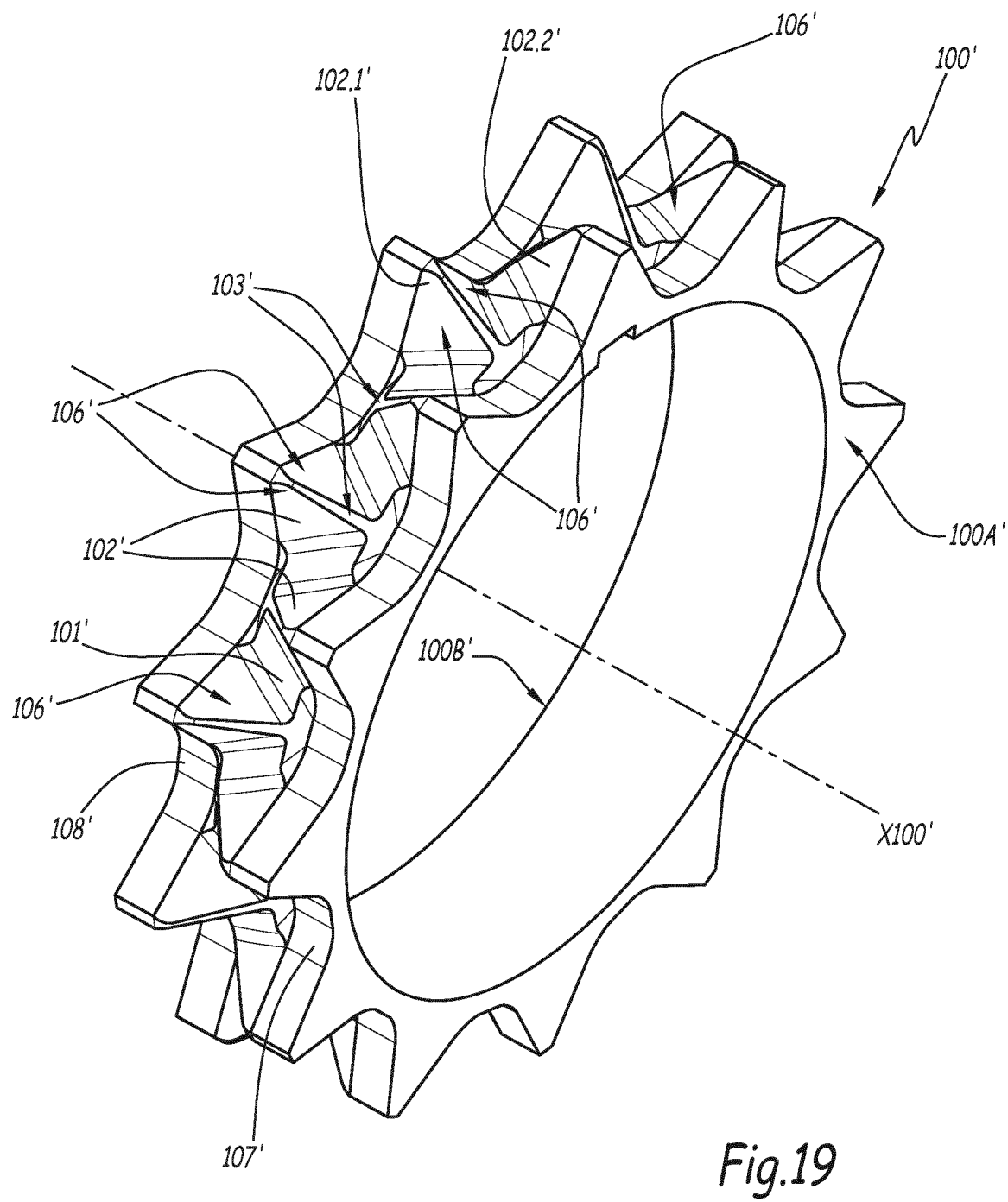
FIG. 19 is a perspective view of a first tool of a pair of tools belonging to a variant of the pinching-shaping device according to the invention.
Figure 20:
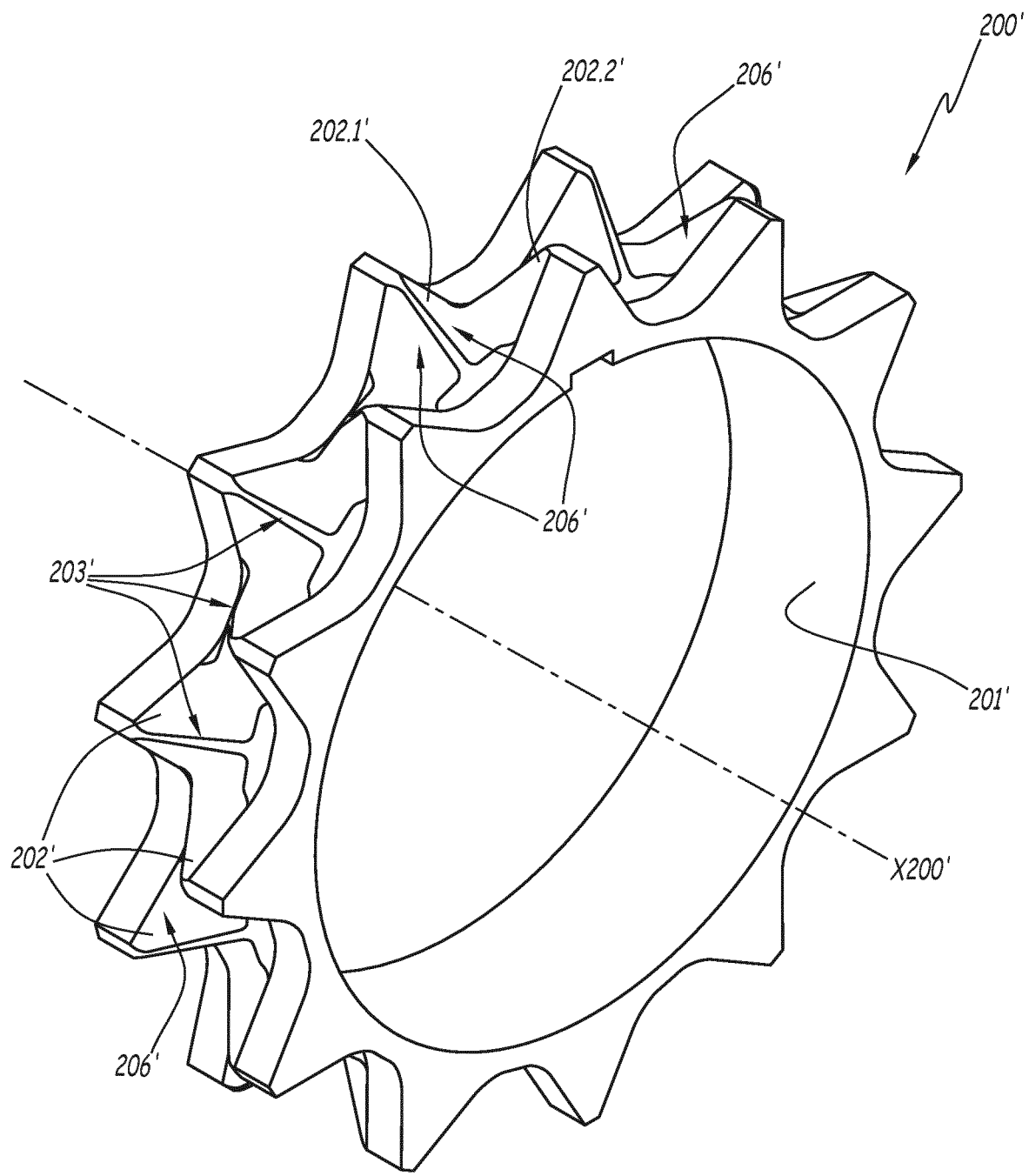
FIG. 20 is a perspective view of the second tool of a pair of tools belonging to the variant of the pinching-shaping device shown in FIG. 19.

A fourth possible arrangement is shown in FIGS. 19 and 20, which show respectively a variant of tool 100, referenced 100', and a variant of tool 200, referenced 200'. The tool 100' comprises a cylindrical body 101', blades 102' and pinching surfaces 103', which are functionally similar to the cylindrical body 101, to the blades 102 and to the pinching surfaces 103 of the tool 100, respectively. The cylindrical body 101' is centered on an axis X100' similar to the axis X100 of the tool 100. The blades 102' are distributed and alternate along the outer periphery of the tool 100' between the blades 102.1' and the blades 102.2', which are functionally similar to blades 102.1 and 102.2, respectively, of the tool 100. Similarly, the tool 200' comprises a cylindrical body 201', blades 202' and pinching surfaces 203', which are functionally similar to the cylindrical body 201, to the blades 202 and the pinching surfaces 203, respectively, of Tool 200. The cylindrical body 201' is centered on an axis X200' similar to the axis X200 of the tool 200. The blades 202' are distributed and alternate along the outer periphery of the tool 200' between the blades 202.1' and the blades 202.2', which are functionally similar to the blades 202.1 and 202.2 of tool 200, respectively. In addition, the tools 100' and 200' are related to each other in a pair, in the same way as detailed above for the tools 100 and 200.

As can be seen in FIG. 19, each of the blades 102' presents two flanks 106' that are located on either side, in an orthoradial direction to the axis X100', of the blade 102'. Unlike the flanks of each of the blades 102', which extend at a constant distance from each other for substantially the entire blade 102, the flanks 106' of each blade 102' gradually diverge from each other as the blade 102' is traversed radially from its pinching surface 103' towards the X100' axis, or even to the cylindrical body 101', and when the blade 102' is traversed axially from the end of its pinching surface 103', the least radially distant from the axis X100', to the end of its pinching surface 103', the most radially distant from the axis X100'. Similarly, as can be seen in FIG. 20, each of the blades 202' presents two flanks 206', which are located on either side of the blade in an orthoradial direction to the axis X200' and which gradually diverge from each other as the blade 202' is radially traversed from its 203' pinching surface towards the axis X200', or even to the cylindrical body 201', and when the blade 202' is axially traversed from the end of its pinching surface 203', the least radially distant from the axis X200', to the end of its pinching surface 203', the most radially distant from the axis X200'.

Thus, each of the blades 102' and 202' presents an overall pyramidal shape. This pyramidal shape mechanically reinforces the blades and ensures that the flanks 106' and 206' hold the strand 2 in position during the pinching-shaping between the tools 100' and 200', at the level of the part of the strand 2 located between the two pinch lines of the berlingot shape. The flanks 106' and 206' thus allow self-centering of the strand 2 opposite the blades 102' and 202' when, in pairs, the latter approach each other until they pinch the strand 2.

Furthermore, in the variant for the 100' tool shown in FIG. 19, the cylindrical body 101' is, compared to the cylindrical body 101 of the tool 100, axially extended on both sides of the blades 102'. As can be seen in FIG. 19, the tool 100' comprises, on each of its opposite axial sides 100A' and 100B', a lateral crown 107' and 108' respectively, which axially extends the cylindrical body 101. The outer face of the lateral crown 107' is inscribed in the axial extension of the axial ends of the tabs 102', located on the axial side 100A' of tool 100'. The outer face of the lateral crown 108' is inscribed in the axial extension of the axial ends of the tabs 102', located on the axial side 100B' of the tool 100'.

The lateral crowns 107' and 108' reinforce the tool 100' and thus give the tool 100' good mechanical strength, even when the tool 100' is made of a plastic material, without the presence of the lateral crowns 107' and 108' affecting the effects of the blades 102' for pinching and shaping of the strand 2.

Of course, the lateral crowns 107' and 108' just described for the tool 100' can be provided for the tool 100.

In addition, various arrangements and variants of the pinching-shaping device 3 are possible:

- in the example shown in the figures, the pinching surfaces 103 and 203 of the blades 102 and 202 are substantially flat in the sense that the running part 103C, 203C of these pinching surfaces is inscribed in a geometric plane; alternatively, all or part of these pinching surfaces, in particular the running part of these latter, can be slightly curved or slightly recessed;
- in the example shown in the figures, the pinching surfaces 103 and 203 of the blades 102 and 202, present, when viewed in a radial direction to the axis X100, X200 of the corresponding tool 100 or 200, have a straight profile between their ends 103A, 203A and 103B, 203B; alternatively, this profile may be slightly curved; and/or
- the outer face of the cylindrical body 101, 201 of the tools 100 and 200 may present, between the blades 102, 202, shape arrangements intended to interfere by contact with the strand 2 during the pinching of the latter, in particular with the part of this strand located between the two pinch lines of the berlingot shape; by interference between the strand 2 and these shaping arrangements, a mechanical effect may then be introduced on the strand, for example a torsional blocking effect or a marking effect on the surface of the strand.

Finally, it should be noted that, although the pinching-shaping device 3 has been described so far as being used on co-extruded food strands, such as the above-mentioned strands 2, this pinching-shaping device 3 can be used on strands other than co-extruded strands, or even on strands other than food strands.

The invention claimed is:

1. A pinching-shaping device, comprising two tools, each tool being cylindrical, each tool having a central axis around which the tool is rotatable, and each tool having an outer periphery,
   wherein the two tools are arranged such that the respective central axes of the two tools are substantially parallel and the respective outer peripheries of the two tools are applied tangentially against each other to pinch-shape a strand inserted tangentially between the two tools upon rotation of the two tools,
   wherein each tool is provided with blades which:
   radially protrude from the outer periphery of the tool, and
   are successively distributed around the central axis of the tool,
   wherein each blade of each tool has a free edge which:
   is radially opposite to the central axis of the tool, and
   is provided with a pinching surface extending between first and second ends of the pinching surface, which are opposite to each other along the central axis of the tool, the respective first ends of the pinching surfaces of each tool being all located on a same first axial side of the tool, while the respective second ends of the pinching surfaces of each tool are all located on a same second axial side of the tool, opposite to the first axial side along the central axis of the tool,
   wherein the pinching surface of each blade of each tool runs inclined with respect to the central axis of the tool between the first end and the second end of the pinching surface, and
   wherein the blades of each tool are distributed, alternatively along the outer periphery of the tool, into at least one first blade and at least one second blade, the first end of the pinching surface of the at least one first blade being radially further from the central axis of the tool than the second end of the pinching surface of the at least one first blade, and the second end of the pinching surface of the at least one second blade being radially further from the central axis of the tool than the first end of the pinching surface of the at least one second blade, whereby each time one blade amongst the blades of a first of the two tools is radially interposed between the two tools upon rotation of the two tools, said one blade of the first tool is radially aligned with one blade amongst the blades of the second tool so that the pinching surface of said one blade of the first tool and the pinching surface of said one blade of the second tool are inclined in a complementary manner to each other and pinch therebetween a strand inserted tangentially between the two tools.

2. The pinching-shaping device according to claim 1, wherein the pinching surface of each blade of each tool runs inclined with respect to the central axis of the tool between the first end and the second end of the pinching surface so that an inclination angle is formed between the pinching surface and the central axis of the tool, the inclination angle being between 30° and 60°.

3. The pinching-shaping device according to claim 2, wherein the inclination angle is equal to 45°.

4. The pinching-shaping device according to claim 2, wherein for each tool, the inclination angle has a same value for all the pinching surfaces of the tool.

5. The pinching-shaping device according to claim 2, wherein for each tool, the inclination angle changes value between the respective pinching surfaces of two successive blades of the tool.

6. The pinching-shaping device according to claim 1, wherein for each tool, the respective pinching surfaces of two successive blades of the tool are angularly offset with respect to each other by an offset angle which is between 45° and 110°.

7. The pinching-shaping device according to claim 6, wherein the offset angle is equal to 90°.

8. The pinching-shaping device according to claim 1, wherein each blade of one and/or other of the two tools is provided with a rib which:
   radially protrudes from the pinching surface of the blade,
   has a smaller orthoradial dimension than an orthoradial dimension of the pinching surface of the blade, and
   extends between the first and second ends of the pinching surface of the blade.

9. The pinching-shaping device according to claim 1, wherein one of the first and second ends of each pinching surface of each tool, which is radially further from the central axis of the tool than the other of the first and second ends of the pinching surface, is blunt.

10. The pinching-shaping device according to claim 1, wherein the pinching-shaping device further comprises at least one scraper which:
    is adapted to scrape the outer periphery of one of the two tools, and
    incorporates at least one blowing nozzle arranged to project a gas flow both tangentially to the outer periphery of said one of the two tools and transversely to the blades of said one of the two tools.

11. The pinching-shaping device according to claim 1, wherein at least one of the two tools is provided with:

on the first axial side of the tool, a first side flange which borders the respective first ends of the pinching surfaces of the tool all around the outer periphery of the tool, and on the second axial side of the tool, a second side flange which borders the respective second ends of the pinching surfaces of the tool all around the outer periphery of the tool.

12. The pinching-shaping device according to claim 1, wherein each of the blades of each tool presents two flanks which:

are located on either side, in an orthoradial direction to the central axis of the tool, of the blade, and progressively diverge from each other both when following the blade radially from the pinching surface of the blade towards the central axis of the tool and when following the blade axially from one of the first and second ends of the pinching surface, which is radially further from the central axis of the tool than the other of the first and second ends of the pinching surface, to said other of the first and second ends of the pinching surface.

13. The pinching-shaping device according to claim 1, wherein each blade of each tool has:

first axial ends that are located on the first axial side of the tool, and second axial ends that are located on the second axial side of the tool, and wherein at least one of the two tools is provided with:

on the first axial side of the tool, a first lateral crown having an outer face that is inscribed in an axial extension of the first axial ends of the blades of the tool, and on the second axial side of the tool, a second lateral crown having an outer face that is inscribed in an axial extension of the second axial ends of the blades.

14. A system for a continuous production of berlingot-shaped co-extruded food products, the system comprising:

a continuous supply that provides at least one co-extruded food strand, and a pinching-shaping device according to claim 1, the at least one co-extruded food strand being to be inserted tangentially between the respective outer peripheries of the two tools of the pinching-shaping device.

* * * * *